(12) United States Patent
Butera

(10) Patent No.: US 8,443,600 B2
(45) Date of Patent: May 21, 2013

(54) ACTUATOR COMPRISING ELEMENTS MADE OF SHAPE MEMORY ALLOY WITH BROADENED RANGE OF WORKING TEMPERATURES

(75) Inventor: Francesco Butera, Como CO (IT)

(73) Assignee: Saes Getters S.p.A., Lainate (MI) (IT)

( * ) Notice: Subject to any disclaimer, the term of this patent is extended or adjusted under 35 U.S.C. 154(b) by 739 days.

(21) Appl. No.: 12/665,200

(22) PCT Filed: Jun. 25, 2008

(86) PCT No.: PCT/EP2008/058087
§ 371 (c)(1),
(2), (4) Date: Dec. 17, 2009

(87) PCT Pub. No.: WO2009/000859
PCT Pub. Date: Dec. 31, 2008

(65) Prior Publication Data
US 2010/0192567 A1 Aug. 5, 2010

(30) Foreign Application Priority Data
Jun. 27, 2007 (IT) .............................. MI2007A1283

(51) Int. Cl.
*F01B 29/10* (2006.01)
(52) U.S. Cl.
USPC ............................................ 60/528; 60/529
(58) Field of Classification Search
USPC .................................................. 60/527–529
See application file for complete search history.

(56) References Cited

U.S. PATENT DOCUMENTS

| 3,849,756 A | 11/1974 | Hickling |
| 4,325,217 A * | 4/1982 | Golestaneh ..................... 60/527 |
| 4,472,113 A * | 9/1984 | Rogen ........................... 417/321 |
| 4,517,543 A | 5/1985 | Brubaker |
| 4,524,343 A | 6/1985 | Morgan et al. |
| 4,896,955 A | 1/1990 | Zider et al. |
| 5,640,217 A | 6/1997 | Hautcoeur et al. |
| 6,151,897 A * | 11/2000 | Baumbick ..................... 60/527 |
| 7,823,382 B2 * | 11/2010 | Ukpai et al. .................... 60/527 |
| 2006/0148296 A1 | 7/2006 | Zanella et al. |

FOREIGN PATENT DOCUMENTS

| EP | 1677014 | 7/2006 |
| JP | 10038708 | 2/1998 |
| JP | 2006189045 | 7/2006 |

OTHER PUBLICATIONS

PCT International Search Report for PCT/EP2008/058087 filed on Jun. 25, 2008 in the name of SAES Getters S.p.A.
PCT Written Opinion for PCT/EP2008/058087 filed on Jun. 25, 2008 in the name of SAES Getters S.p.A.
PCT International Preliminary Report on Patentability for PCT/EP2008/058087 filed on Jun. 25, 2008 in the name of SAES Getters S.p.A.
M. Kohl et al., "Linear Microactuactors based on the shape memory effect", Elsevier Science S.A., 1998, 104-111.

(Continued)

*Primary Examiner* — Hoang Nguyen
(74) *Attorney, Agent, or Firm* — Steinfl & Bruno LLP

(57) ABSTRACT

An actuator is described in which a functional element is made of a shape memory alloy, and the actuator includes means for increasing the load applied onto the functional element when the external temperature increases, thus causing a consequent variation of transition temperatures characterizing the hysteresis cycle of the functional element.

4 Claims, 2 Drawing Sheets a)

b)

OTHER PUBLICATIONS

Figure 1:
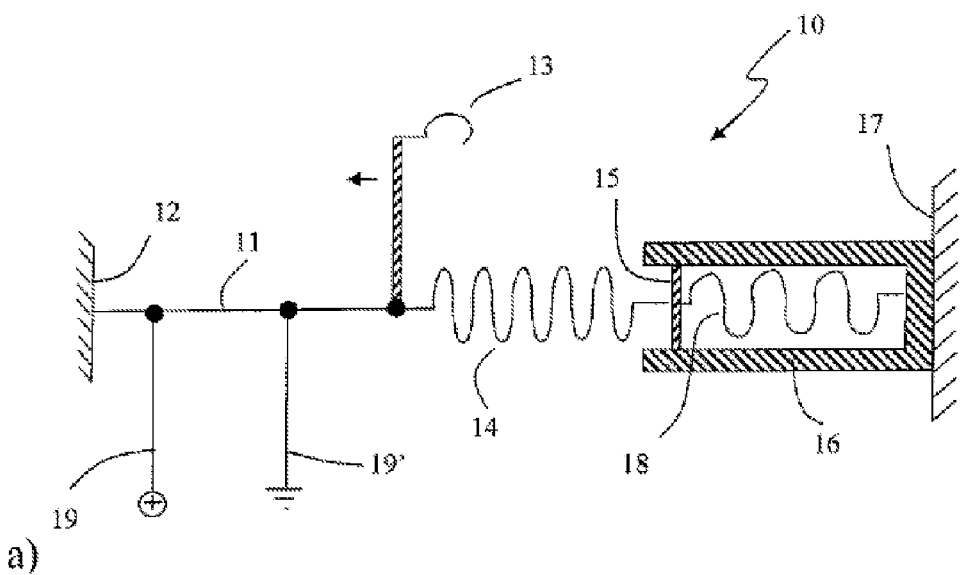
Figure 1:
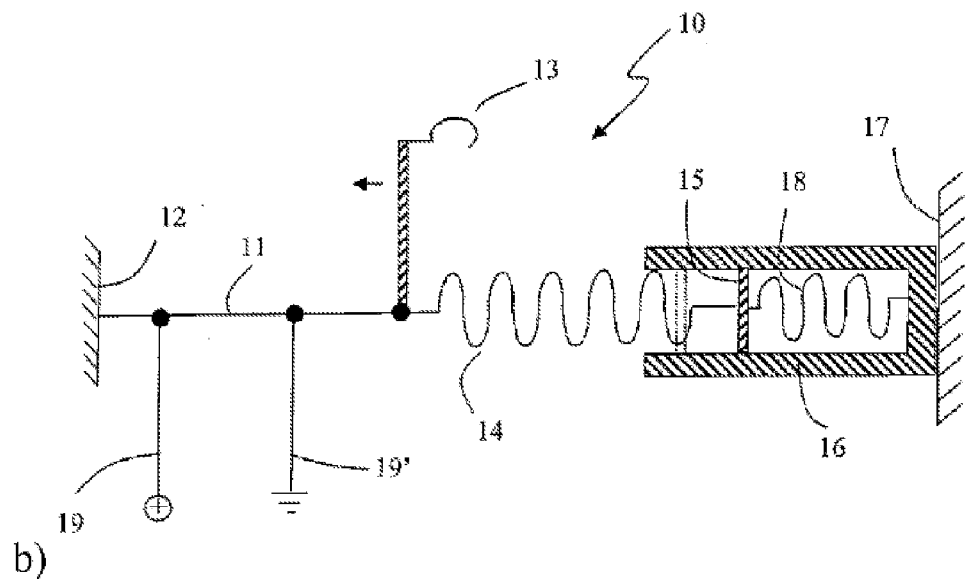

Japanese Office Action mailed on Nov. 8, 2011 for Japanese Application 2010-513906 filed on Dec. 17, 2009 in the name of SAES Getters S.p.A.
Chinese Office Action mailed on Apr. 26, 2012 for Chinese Application 200880022137 filed on Dec. 17, 2009 in the name of SAES Getters S.p.A. (Chinese and English).
Reply to Chinese Office Action mailed Apr. 26, 2012 (Chinese and English).

* cited by examiner

ACTUATOR COMPRISING ELEMENTS MADE OF SHAPE MEMORY ALLOY WITH BROADENED RANGE OF WORKING TEMPERATURES

CROSS REFERENCE TO RELATED APPLICATIONS

The present application is the national stage of International Application PCT/EP2008/058087 filed on Jun. 25, 2008 which, in turn, claims priority to Italian Application MI2007A001283, filed on Jun. 27, 2007.

The present invention relates to an actuator comprising elements made of shape memory alloy, which keeps its functionality in a range of temperatures that is broader than for similar known actuators.

Shape memory alloys are commonly known in the field with the acronym "SMA". Although various composition of SMAs are known, the only ones used in practice are those of Ni—Ti composition, preferably comprising from 54 to 55.5% by weight of nickel, balance titanium (traces of other components are possible).

As it is known, a mechanical part made of a Ni—Ti alloy is capable of interchanging between two shapes, in consequence of a change of temperature that causes a phase transition in the alloy microstructure. The stable phase at the higher temperatures is called austenite, while the one stable at lower temperatures is called martensite. The transformation between the two phases occurs according to a hysteresis cycle in a temperature-deformation diagram, characterized by four temperature values: when heating, starting from the low temperatures at which the martensitic phase is stable, a temperature $A_S$ is reached at which the transformation into the austenitic phase begins, then a temperature $A_f$ ($A_f > A_S$) at which the transformation into austenite is complete; when cooling, starting from a temperature at which the austenitic phase is stable, a temperature $M_s$ is reached at which the transformation into the martensitic phase begins, thereafter a temperature $M_f$ ($M_f < M_S$) at which such a transformation is complete. Diagrams of these hysteresis cycles are shown, e.g., in the U.S. Pat. No. 4,896,955 and EP 807276.

Devices or components comprising active elements made of a SMAs (for the sake of brevity defined in the following as SMA actuators) are known and studied mainly in the automotive field to replace actuators employing electric motors, for example in the locks of cars; in the following of this description reference will be made in particular to SMA elements with a wire shape, but the actuators of the invention could also employ these elements shaped as strips or the like. In the SMA actuators so far proposed the wire heating is generally obtained by causing electric current to flow therein; the consequent shape transition is spontaneous and exerts an appreciable strength, capable of transmitting a motion to a mobile part being linked thereto. The contrary transition to the martensitic phase occurs as a consequence of the natural cooling of the wire upon cutting off the current flow, and returning to the initial conditions of shape is favoured by application of a force (such as by a bias spring or similar methods).

So far, the use of SMA actuators in the automotive industry has been restricted by the requirements imposed by the same, demanding for the mobile parts a life of at least 50,000 cycles (e.g. of opening-closing in case of a locking mechanism) at temperatures in the range from −20 to +80° C. SMA wires made of Ni—Ti alloys have typically $M_f < 80°$ C., with the consequence that the transition to the martensitic phase occurs only with a great difficulty or does not occur at all and the actuator cannot carry out a complete operation cycle.

It is known that, by increasing the load applied to a SMA wire, it is possible to shift its hysteresis curve toward higher temperatures; therefore it would be possible in principle, by suitably pre-tensioning the wire, to obtain a SMA actuator capable of correctly operating even at 80° C.; however, a constant heavy load would have the disadvantage of rapidly weakening the wire, thus causing its breaking or anyway the loss of functionality of the actuator after few thousands of cycles.

It is an object of the present invention to provide a SMA actuator capable of overcoming the above-mentioned problems.

This object is achieved with an actuator comprising:
- a first element made of a shape memory alloy capable of changing its shape upon heating, with a stationary first end and a second end being connected to a controlled mechanical part;
- means for heating said first element of shape memory alloy; and
- bias means to allow said first element to return to its original shape during cooling, these means having a first end connected to the second end of said first element and a second end connected to an inner restraint of the actuator, characterized in that it further comprises means suitable to move said inner restraint of the actuator and to increase the load applied onto said bias means when the external temperature exceeds the value $M_f$ of said first element of shape memory alloy.

The invention is based on the observation that, even when the requirements of the final application impose relatively high test temperatures, these are not the constant working temperatures of the SMA actuators; usually in the final application an actuator will have to carry out only some of its cycles at high temperatures, and other cycles at lower temperatures. It is therefore possible to design and employ an actuator in which the load applied onto the functional SMA element may vary with the temperature, in such a way that its hysteresis cycle develops above the external temperature for each value thereof. According to the invention, to the functional SMA element is applied a small load at relatively low external temperatures in order not to stress in a excessive and useless way such an element, and a heavier load when the external temperature exceeds a threshold value, such as of +80° C.

The means to increase the load applied onto the bias means and thus, indirectly, onto the functional SMA element, can be various. In principle even manual means can be foreseen, such as a lever moved by an operator when this observes that the actuator does not work correctly anymore. More commonly the means to increase the load are such to autonomously react to an increase of the external temperature; it is possible for example to employ a motor being connected to a temperature sensor; a metallic portion of sufficient length (e.g. spirally wound) that elongates when temperature increases; or a bimetallic part that varies its shape when its threshold temperature is reached.

In the preferred embodiment of the invention the means to move the inner restraint of the actuator and to increase the load applied onto the bias means are formed as a second shape memory element in thermal equilibrium with the surrounding environment, and having a stationary end and an end linked to the inner restraint of the actuator; this second SMA element must be so dimensioned to exert, during the transition in consequence of the heating, a strength greater with respect to the first SMA element. In the following reference will be made to the invention in this preferred embodiment thereof.

Figure 2:
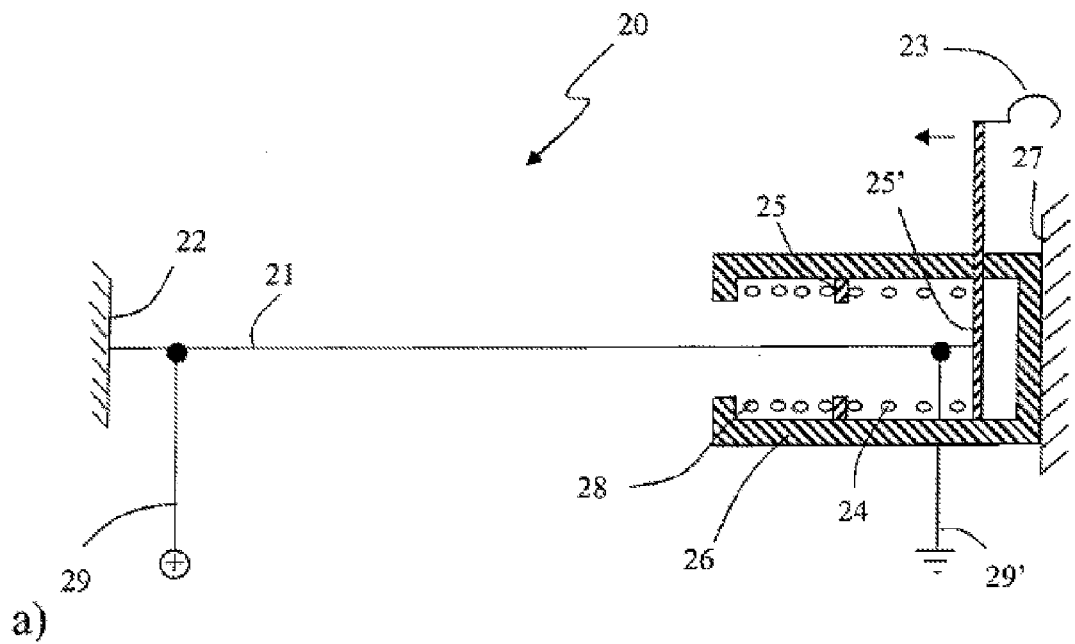
Figure 2:
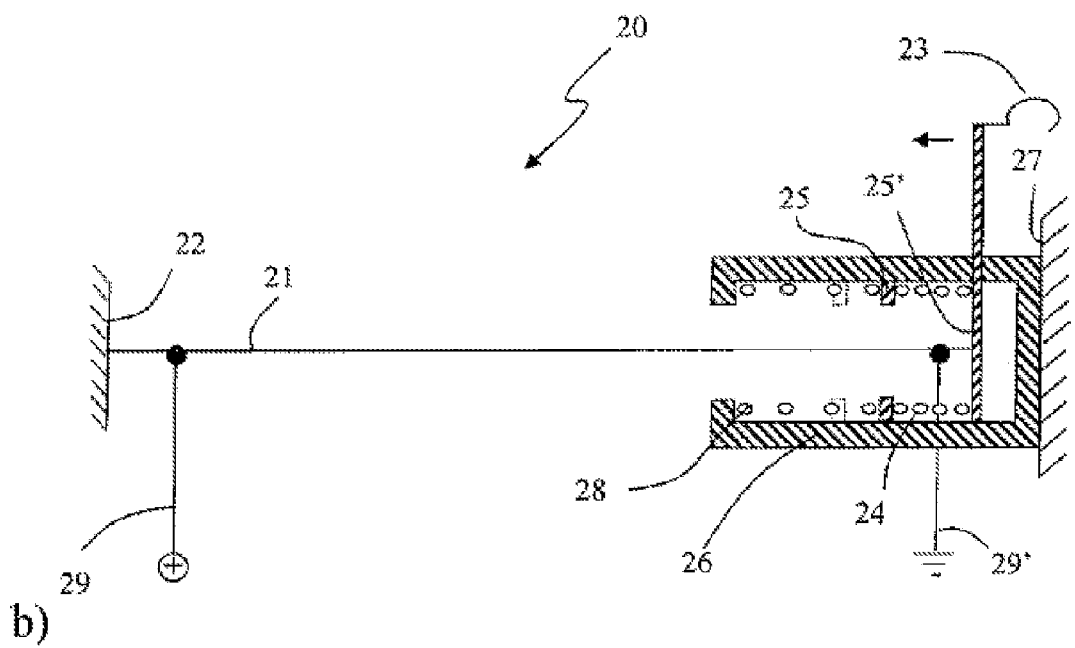

The invention will be illustrated in the following with reference to the drawings, in which:

FIG. 1 schematically shows an actuator of the invention in a first embodiment thereof; in particular portion a) of the drawing shows the actuator in the condition of low temperature, portion b) the actuator in the condition of high temperature;

FIG. 2 schematically shows a possible alternative embodiment of an actuator of the invention; also in this case portion a) of the drawing shows the actuator in the condition of low temperature, portion b) the actuator in the condition of high temperature.

FIG. 1a schematically shows the actuator of the invention in a condition of low temperature, i.e. when it operates at a temperature $T_{a1}$ of the external environment which is relatively low, such as less than 50° C.

The actuator 10 consists of a SMA wire 11, which forms the first element of SMA as previously defined and has a first end (on the left-hand side in the drawing) joined to a stationary part schematically represented as a wall 12 in the drawing, and a second end connected to a controlled mechanical part (not shown), for example through a hook 13; the controlled mechanical part can be of whichever type carrying out its function through a movement that can be of translation or rotation, e.g. a part of a lock; in the drawing it is exemplified the case is in which hook 13 carries out its action by moving toward the left hand side, as shown by the arrow. The second end of wire 11 is linked to the first end of bias means which, when cooling, favour the return of wire 11 to the shape or size stable at low temperature; it is exemplified the case in which this bias means consists of a usual spring 14. The second end of the spring is fixed to a slider 15 which forms an inner restraint of the actuator. The slider 15 is housed in a cylinder 16, fixed in its turn to a wall 17 at the outside of the actuator and forming an external stationary restraint of the same actuator. At the opposite side of slider 15 with respect to spring 14 there is fixed a second SMA element 18, housed in the cylinder; in particular the second SMA element has a first end fixed to the slider 15 and the second end fixed to the cylinder bottom; element 18 is represented in the drawing as a spring, but it could have any shape, for example it could be a strip or again a wire of greater diameter than that of wire 11. Both the SMA elements in actuator 10, namely wire 11 and element 18, have been educated in the manufacturing stage to contract upon heating. Wire 11 is joined to means for its heating; in the drawing such a means is represented by conductors 19, 19' being connected to an electric power source (not shown) in order to heat wire 11 by current flow and cause thereby its phase transition. On the contrary element 18 is in thermal equilibrium with the surrounding environment. Wire 11, spring 14 and element 18 are so dimensioned that the pull strength exerted by element 18 is greater than that of wire 11, which in turn is greater than that exerted by spring 14. The load on wire 11 corresponds to the pull of spring 14; because with low loads applied the value of temperature $M_f$ for a wire of Ni—Ti alloy is of about 65° C., at the indicated temperature $T_{a1}$ (50° C.) the whole hysteresis cycle develops above the external temperature and the actuator is able to work correctly, with wire 11 being heated by current flow in the wire itself and natural cooling.

FIG. 1b shows actuator 10 when the external temperature increases and reaches e.g. a value of about 80° C. At this temperature element 18, in thermal equilibrium with the outside, carries out the phase transition and modifies its shape by contraction; slider 15 is shifted to the right hand side in the drawing (the original position of the slider is shown by dotted lines), thus increasing the tension on spring 14; this involves an increased load onto wire 11, with consequent shift to the high temperatures of the hysteresis cycle of the latter, but without any movement of the part to be controlled, due to the wire 11 being inextensible. By suitably dimensioning element 18 and spring 14, this shift is such that $M_f>80°$ C., thus bringing again the system to a condition in which the whole hysteresis cycle develops above the external temperature and wire 11 can change from austenitic to martensitic phase by natural cooling, thereby allowing the correct functioning of actuator 10 also at 80° C.

When the external temperature decreases element 18 returns to the martensitic phase and the whole system comes back to the configuration shown in FIG. 1a, thus slackening the load on wire 11 and avoiding its weakening or breaking, which would be caused by the constant high load if the actuator always remained in the configuration of FIG. 1b.

FIG. 2 shows a possible alternative embodiment of the actuator according to the invention. The actuator is shown in FIG. 2a in its configuration at low temperature. Actuator 20 is rigidly fixed to a stationary restraint 27 (a wall external to the system) and comprises a wire 21 made of SMA having its first end stationary (e.g. joined to a wall 22) and the second end connected to a slider 25' which is in turn linked to a controlled mechanical part (not shown) through hook 23. Wire 21 can be heated trough means 29, 29' (exemplified in the drawing as electrical conductors to feed the current flow throughout the wire 21 itself) and has been educated in the manufacturing stage to contract upon heating. Slider 25' is also linked to the first end of a spring 24 providing for the bias means of the system (for the sake of drawing clarity, in this case spring 24 is represented in cross section). At each given temperature slider 25' has a certain position, determined by the strength of spring 24 which works under compression. The actuator also comprises a second element made of SMA, represented in the drawing as a second spring 28 (shown in cross section for the sake of drawing clarity), which however could assume any functionally equivalent shape. The second SMA element 28 has a first end fixed to the inner wall of a cylinder 26 which is integral with restraint 27, and a second end fixed to a second slider 25, which is free to move within cylinder 26 and also having the second end of spring 24 fixed thereto. The second slider 25 forms the inner restraint of the actuator. Cylinder 26 houses the whole assembly of elements 24, 25, 25' and 28. Element 28 has been educated during its manufacturing stage to expand upon heating. Also in this case elements 21, 24 and 28 are so dimensioned that the pull exerted by element 28 is greater than that of wire 21, which in turn is greater than that exerted by spring 24. When the temperature outside of the actuator is such that wire 21 can accomplish a complete cycle of hysteresis, the system works merely according to the contraction of wire 21 in consequence of its heating through means 29, 29', and of its elongation in consequence of natural cooling.

FIG. 2b represents the configuration of actuator 20 upon increasing of the external temperature, in particular up to T values at which wire 21 would not be able anymore to return to the martensitic phase by natural cooling. In this situation the second SMA element 28 carries out its phase transition by elongating and pushing the second slider 25 to the right hand side in the drawing; this causes compression of spring 24, which in turn moves to the right the first slider 25', thus increasing the load onto wire 21 and bringing it again to the condition in which its whole hysteresis cycle develops above the external temperature, thus allowing the correct functionality of actuator 20 also in this second condition of higher temperature.

The invention has been here described in two possible embodiments thereof, but it will be clear to those skilled in the art that many variations are possible, which however remain within the scope of the invention itself; for example, according to the specific structure of the actuator, each one of the two SMA elements, independently from the other, can be educated to contract or elongate when heating; each one of the two SMA elements, independently from the other, may be in the shape of a wire, a strip, a spring or other functional shapes suitable to the specific purpose; the bias means illustrated here always as usual springs, can have any shape being functionally suitable to the purpose; and the geometric relationship between the various parts of the actuator can be varied at will, provided that the general conditions indicated in the broadest definition of the invention corresponding to the main claim are fulfilled.

The invention claimed is:

1. An actuator employing elements made of a shape memory alloy comprising:
   a first element made of a shape memory alloy capable of modifying its shape upon heating, having a stationary first end and a second end linked to a controlled mechanical part;
   heating means for heating said first element made of a shape memory alloy;
   bias means for allowing return of said first element to its original shape during cooling, the bias means having a first end connected to the second end of said first element and a second end connected to an inner restraint of the actuator; and
   moving means capable of moving said inner restraint of the actuator to increase a load applied onto said bias means when external temperature exceeds a value $M_1$ of complete transformation into a martensitic phase of said first element made of shape memory alloy,
   wherein said moving means capable of moving said inner restraint of the actuator is such to autonomously react to an increase of the external temperature.

2. The actuator according to claim 1, wherein the moving means for increasing the load are housed in a containing element.

3. The actuator according to claim 1, wherein the moving means for moving the inner restraint are chosen among a motor connected to a temperature sensor, metallic parts which elongate upon heating, or bimetallic elements.

4. The actuator according to claim 1, wherein the moving means for moving the inner restraint are formed of a second element made of a shape memory alloy in thermal equilibrium with a surrounding environment, the second element being so dimensioned to exert, during a transition consequent to heating, a force higher than that exerted by said first element made of shape memory alloy and having a first stationary end and a second end linked to said inner restraint of the actuator.

* * * * *